No. 789,752. PATENTED MAY 16, 1905.
C. H. MOORE.
LEADEN TRAP.
APPLICATION FILED JULY 25, 1903.
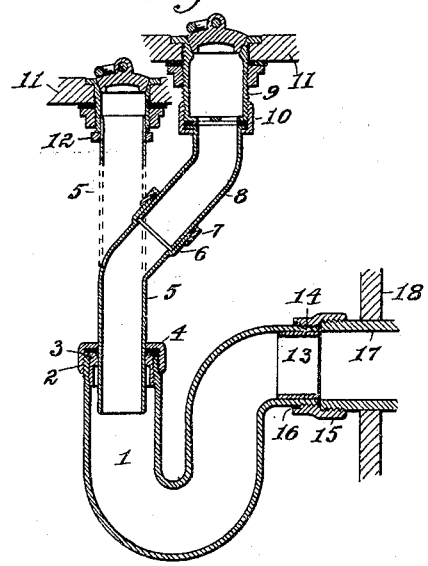
WITNESSES: Bishop A. Chamberlin
C. L. Moore
INVENTOR.
Charles H. Moore No. 789,752. Patented May 16, 1905.

UNITED STATES PATENT OFFICE.

CHARLES H. MOORE, OF NEW YORK, N. Y.

LEADEN TRAP.

SPECIFICATION forming part of Letters Patent No. 789,752, dated May 16, 1905.

Application filed July 25, 1903. Serial No. 167,060.

*To all whom it may concern:*

Be it known that I, CHARLES H. MOORE, a citizen of the United States of America, and a resident of New York city, State of New York, have invented a new and useful Improvement in Leaden Traps, of which the following is a specification.

This invention relates to a leaden or soft-metal trap exclusively—that is, any metal softer than brass—on which it has always been customary to make a solder-joint in connecting the inlet end to the coupling that attaches to the basin and a solder-joint in connecting the outlet end to the waste-pipe.

In the use of leaden traps it is always necessary to do some fitting, such as cutting the end off to get the right length, dressing the end in to the size of the coupling, and preparing it to receive the solder-joint. One objection to this solder-joint at either end of a leaden trap is it frequently happens that in making it solder leaks in between the lead and brass where the tube of the coupling abuts against the pipe, forming burs when the metal gets hard, and to these obstructions stringy matter will cling and the pipe become clogged by dregs that accumulate thereto. Another objection to soldering the basin-coupling on the inlet end of a leaden trap is it makes the connection rigid, and there is no way to get at the end of it to remove the fibrous substance that is certain to accumulate on the cross-bar strainers that are invariably made in couplings. Another objection is it requires a fire to heat the solder, and this is sometimes inconvenient to get.

The object of my invention is to simplify this inlet connection on leaden traps and make the inlet end vertically adjustable, so that it can be pushed down into the trap and away from the basin-coupling to get access to the end of the said basin-coupling to remove any obstruction therefrom, the same as the convenience afforded by the use of brass traps and with the sanitary feature of a perfectly smooth inner surface (that is not found in brass traps) and to make the outlet end so that the trap can be screwed to an iron or brass waste-pipe. To further add to the convenience of the invention, I use two curved fittings, adjustable upon each other in either direction, on the inlet end of the trap, so that accurate measure in placing the end of the waste-pipe to which the trap is to be connected is not essential.

In the accompanying drawings, forming a part of this specification, Figure 1 represents a central vertical section of the invention, showing also the manner of using the trap, with a straight tube leading to the basin or sink coupling. Fig. 2 shows the present customary way of connecting the end of a leaden trap to the basin-coupling, the end of the trap dressed in, the solder-joint 20, and burs 21, referred to for the purpose of clearly defining the departure from the old plan to my invention.

1 represents a leaden pipe-shape trap of the usual form.

2 is a thread cut on the outside of the inlet end of the said trap, and 3 is a socket and guide fitted closely to the wall of the inlet end and soldered thereto by preference. The passage through this socket is the size of the outside of the tube that is vertically adjustable in the end of the trap. This socket is of harder metal than the trap and is set in the end of the trap before the thread on the outside is cut, by preference only, to reinforce the end, so that it will retain a perfect circular form and permit a full thread to be cut; but I reinforce the end principally so that the thread on the end will maintain its shape and fullness against contraction caused by the lead getting cold after very hot water has flowed through it and against the pressure of the nut and misusage a trap is liable to get in handling.

4 shows a nut screwed on the inlet end of the trap.

5 is a tube that enters the inlet end of the trap and is made long enough so that the trap can have a few inches vertical adjustment.

6 is an enlarged recessed end of the curved tube 5.

7 is a nut.

8 is a curved tube having the lower end adjustable within the recessed end of the tube 5 and is made long enough so that the proper adjustment can be obtained. These curved tubes 5 and 8 can be turned in any position to meet the wasteway from the basin or sink.

9 is a basin-coupling.

10 is a coupling-nut, and 11 represents a section of a basin or sink having the coupling and trap connected thereto.

13 shows the outlet end of the trap, and 14 shows a ring of stiff metal put within the end of it to reinforce the wall and stiffen it. A thread is cut on this leaden outlet end, and a coupling 15 is screwed thereon to make the joint complete, so that the trap can be screwed to a regular iron-pipe-size waste-pipe.

17 represents an iron or brass pipe to which the trap is screwed.

18 shows the wall.

The socket 3 is flanged, so that the first thread will begin on it and be stiff; but this flange and the thread on the socket that screws into the lead inlet end may be omitted.

The advantages claimed are cheapness in connecting the basin-coupling to the trap; convenience of making the joint without having to use solder; convenience of getting at the end of the basin-coupling to remove any obstruction therefrom; freedom from metal burs in the pipe.

What I claim as new, and desire to secure by Letters Patent, is—

1. A leaden or soft-metal waste-water trap having a reinforcing-socket and guide of stiffer material than the trap fitted closely to the wall of the inlet end and secured thereto, a thread cut on the end of the reinforcing-socket, a nut screwed thereon, and a two-curved adjustable connection between the basin-coupling and trap, and nuts to complete the connection substantially as described.

2. A leaden or soft-metal waste-water trap having a reinforcing-socket and guide of stiffer material than the trap fitted closely to the wall of the inlet end and secured thereto, a thread on the end of the reinforcing-socket, two curved upper sections adjustable upon each other in the direction of their length, the lower section being adjustable within the socket and guide and inlet end of the trap, and coupling-nuts to complete the connection substantially as described.

3. A leaden or soft-metal waste-water trap having a reinforcing-socket and guide of stiffer material than the trap fitted closely in the inlet end and soldered thereto, a thread cut on the outside of the inlet end of the trap while a reinforcing-fitting is within the end of the trap to preserve a circular form and permit a perfect thread to be cut, a tube within the socket whereby the inlet can be lengthened vertically, a basin-coupling, and a nut on the trap to complete the connection substantially as described.

4. In a leaden waste-water trap, a reinforcing-fitting secured within the discharge end, a thread cut on the outside of the said lead discharge end, and a metal fitting screwed on the threaded discharge end and arranged to be connected to an iron or brass waste-pipe, in combination with fittings at the inlet end of the trap to complete the connection with the basin-coupling substantially as described.

5. A leaden waste-water trap having reinforcing-fittings secured to the inner wall of the inlet and outlet ends, threads cut on the outside of the lead inlet and outlet ends, a coupling secured on the outlet end to make a rigid connection with the waste-pipe, and fittings on the inlet end to complete the connection with a basin or sink substantially as described.

6. A leaden or soft-metal waste-water trap having a reinforcing-socket and guide of stiffer material than the trap fitted closely to the inner wall of the inlet end and secured thereto exclusively for the purpose of protecting the said inlet end from getting bent and against contraction, a thread cut on the end of the reinforcing-socket, a nut screwed thereon, a tube within the reinforcing-socket whereby the inlet end can be lengthened vertically, a coupling, and a coupling-nut to complete the connection, substantially as described.

7. A leaden waste-water trap having a flanged reinforcing-socket and guide of stiffer material than lead secured on the inlet end, a thread cut partly on the stiff metal and partly on the lead, a nut screwed thereon, a tube within the reinforcing-socket whereby the trap can be lengthened vertically, and a coupling to complete the connection with a basin or sink substantially as described.

8. A leaden or soft-metal waste-water trap having a thread cut on the inner wall of the inlet end, a threaded reinforcing-fitting of stiffer material than the trap, screwed into the said inlet end, a thread cut on the end of the reinforcing-fitting above the inlet end of the trap and independent of the thread that is screwed into the said inlet end, a nut screwed thereon, one or more tubes to make the connection between the inlet end of the trap and the basin-coupling, and the necessary coupling-nuts to complete the connection, as and for the purpose set forth.

CHARLES H. MOORE.

Witnesses:
JOHN J. KIELY,
PETER G. OTTENDORFER.